United States Patent

Liu

[11] Patent Number: 6,128,268
[45] Date of Patent: Oct. 3, 2000

[54] DRIVING MECHANISM FOR A RECORD PLAYER

[75] Inventor: Han-Chih Liu, Tainan, Taiwan

[73] Assignee: Hanpin Electron Co., Ltd., Tainan, Taiwan

[21] Appl. No.: 09/262,032

[22] Filed: Mar. 4, 1999

[51] Int. Cl.[7] .......................... G11B 17/028; G11B 19/20
[52] U.S. Cl. ............................. 369/266; 369/264
[58] Field of Search ..................... 369/264, 266, 369/269, 270; 360/99.08

[56] References Cited

U.S. PATENT DOCUMENTS

| | | | |
|---|---|---|---|
| 3,988,024 | 10/1976 | Watanabe et al | 369/266 |
| 4,153,257 | 5/1979 | Wittenberg et al. | 369/58 |
| 4,805,054 | 2/1989 | Kamoto et al. | 360/97.01 |
| 5,748,406 | 5/1998 | Morimoto et al. | 360/99.12 |

FOREIGN PATENT DOCUMENTS

| | | |
|---|---|---|
| 198 32 042A1 | 3/1999 | Germany . |
| 8-297911 | 11/1996 | Japan . |
| 2 338 819A | 12/1999 | United Kingdom . |

*Primary Examiner*—William Klimowicz
*Attorney, Agent, or Firm*—Rosenberg, Klein & Lee

[57] ABSTRACT

A driving mechanism for a record player includes a fixing base, a solenoid, a housing, a spindle, a sleeve, a turntable and a magnetic ring. The solenoid is fixed on the fixing base for rotating the housing. The spindle is located in the center of the housing and extends upward through the sleeve fixed in a center hole of the turntable. The magnetic ring is fixed under the lower surface of the turntable and faces the upper surface of the housing with an aperture, producing strong magnetism against the housing. Thus, the turntable is pulled down-ward to increase tightness between itself and the sleeve so that the turntable may rotate synchronously with the spindle, preventing inertia torque and slide difference between the turntable and the spindle.

2 Claims, 2 Drawing Sheets

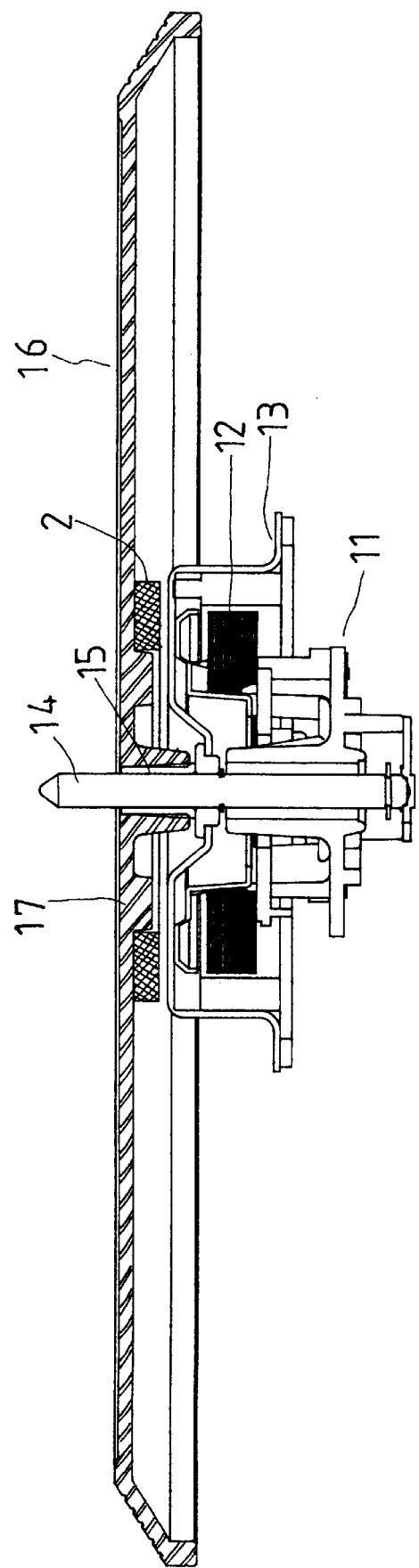
F I G. 1

DRIVING MECHANISM FOR A RECORD PLAYER

BACKGROUND OF THE INVENTION

This invention relates to a driving mechanism for a record player, particularly to one utilizing magnetism for directly attracting a turntable, enabling the record player to start, rotate and stop very accurately and smoothly.

A known conventional record player shown in FIG. 2 includes a fixing base 11, a solenoid 12 of a motor and a housing 13 fixed on the fixing base 11, a spindle 14 rotated by the solenoid 12, a sleeve 15 for the spindle 14 to fit in, and a turntable 16 having a center hole for receiving tightly the sleeve 15. When the turntable 16 is rotated, a record laid on the turntable 16 is also rotated at the same time.

The known conventional record player has been manufactured and used for a long time, and it has been found that the sleeve 15 and the turntable 16 often have instant inertia torque and slide difference in starting and stopping. Thus, sliding sounds may happen to the record player and it effects the quality of sound.

SUMMARY

A main aim of the invention is to offer a driving mechanism for a record player, improved on the disadvantage of the known conventional one by adding a magnetic ring under the lower surface beside an annular projection so that magnetism produced by the magnetic ring may attract the housing to increase tightness between the turntable and the sleeve so as to eliminate slide difference and inertia torque of the spindle and the turntable, thus reducing negative effect to sound quality.

Another aim of the invention is to offer a driving mechanism for a record player, enabling the spindle and the turntable to start, rotate and stop synchronously by means of the magnetic ring attracting the housing of the motor, and consequently ensuring output of perfect sound quality.

BRIEF DESCRIPTION OF THE DRAWINGS

This invention will be better understood by reference to the accompanying drawings, wherein:

FIG. 1 is a cross-sectional view of a driving mechanism for a record player of the present invention.

DETAILED DESCRIPTION OF THE PREFERRED EMBODIMENT

Figure 2:
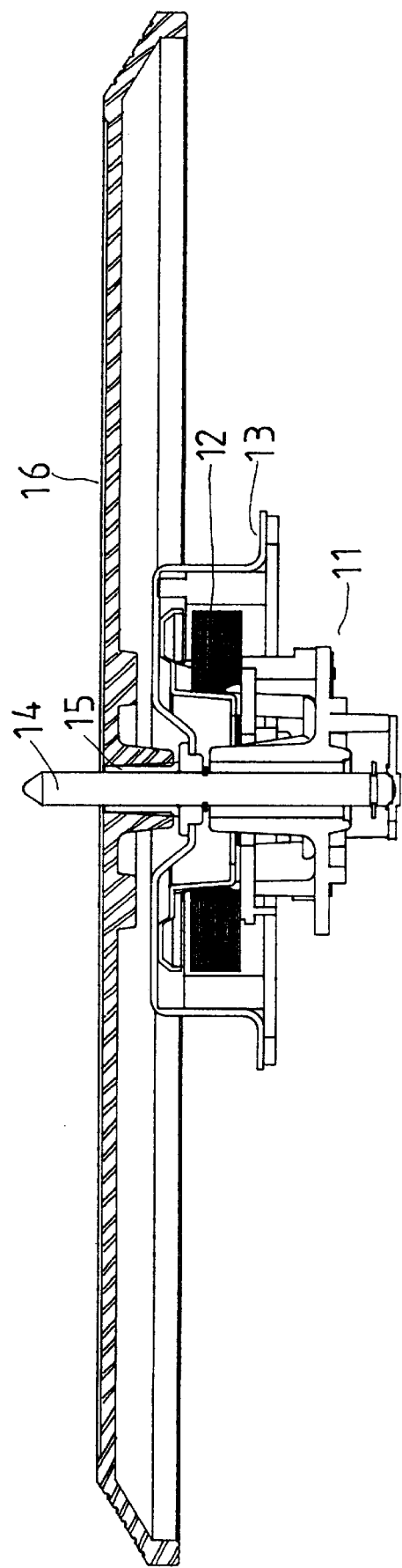
FIG. 2 is a cross-sectional view of a known conventional driving mechanism for a record player.

A preferred embodiment of a driving mechanism for a record player, as shown in FIG. 1, includes a fixing base 11, a solenoid 12, a housing 13, a spindle 14, a sleeve 15 and a turntable 16 as those in the known conventional one, and a magnetic ring 2 additionally fixed under the lower surface of the turntable 16 around an annular projection 17. The magnetic ring 2 is separated from the upper surface of the housing 13 with a proper aperture, producing a properly strong attracting force against the housing 13 so that the sleeve 15 receives a downward force of the turntable 16, increasing tightness between the sleeve 15 and the turntable 16. Consequently, when the housing 13 and the spindle 14 rotate, the turntable 16 may rotate easily and synchronously with the spindle 14. In addition, in starting and stopping, the turntable 16 may also start and stop synchronously with the spindle 14, without giving rise to slide of the record and sound thus caused, with the housing 13 also moving synchronously to cause no noise to worsen sound quality and preventing the record player from being damaged.

What is claimed is:

1. A driving mechanism for a record player comprising a fixing base, a solenoid, a housing, a spindle, a sleeve, a turntable and a magnetic ring; said solenoid fixed on said fixing base for moving said housing, said spindle located in the center of said housing and extending upward and passing through said sleeve fixed in a center hole of said turntable, said turntable started, rotated and stopped with said spindle rotating together with said housing, and characterized by said magnetic ring fixed under a lower surface of said turntable and around an annular projection thereon, said magnetic ring facing an upper surface of said housing with an aperture and producing attractive force against said housing so that said turntable with a record may rotate synchronously with said spindle and said housing, said driving mechanism increasing tightness between said turntable and said sleeve to prevent inertia torque and slide difference from happening between said spindle and said turntable.

2. The driving mechanism for a record player as claimed in claim 1, wherein said magnetic ring is separated from the upper surface of said housing with a proper aperture, said turntable is pulled down by magnetism produced by said magnetic ring against said housing so that said turntable contacts very tightly with said sleeve so as to ensure said turntable rotates synchronously with said spindle.

* * * * *